United States Patent
Jiang et al.

(10) Patent No.: US 12,243,215 B2
(45) Date of Patent: Mar. 4, 2025

(54) METHOD FOR SEGMENTING IMAGES

(71) Applicant: University of Washington, Seattle, WA (US)

(72) Inventors: Tianyu Jiang, Seattle, WA (US); Xu Chen, Seattle, WA (US); Mengying Leng, Seattle, WA (US)

(73) Assignee: Univeristy of Washington, Seattle, WA (US)

( * ) Notice: Subject to any disclaimer, the term of this patent is extended or adjusted under 35 U.S.C. 154(b) by 303 days.

(21) Appl. No.: 17/721,905

(22) Filed: Apr. 15, 2022

(65) Prior Publication Data

US 2022/0335595 A1 Oct. 20, 2022

Related U.S. Application Data

(60) Provisional application No. 63/176,737, filed on Apr. 19, 2021.

(51) Int. Cl.
  *G06T 7/00* (2017.01)
  *G06T 5/40* (2006.01)
  *G06T 7/162* (2017.01)

(52) U.S. Cl.
  CPC .............. *G06T 7/0004* (2013.01); *G06T 5/40* (2013.01); *G06T 7/162* (2017.01); *G06T 2207/20092* (2013.01)

(58) Field of Classification Search
  CPC ......... G06T 7/0004; G06T 5/40; G06T 7/162; G06T 2207/20092; G06T 5/92;

(Continued)

(56) References Cited

U.S. PATENT DOCUMENTS 10,048,661 B2   8/2018  Arthur et al.
2005/0041850 A1*  2/2005  Watkins .................. G06T 5/94
                                                    382/145

(Continued)

FOREIGN PATENT DOCUMENTS

DE  102004017769 B4  12/2004
DE     60108390 T2  12/2005
DE  102007056984 A1   5/2009

OTHER PUBLICATIONS

I. Gibson, D.W. Rosen, B. Stucker, et al. Additive manufacturing technologies. Springer, 2014, vol. 17.

(Continued)

*Primary Examiner* — Negussie Worku
(74) *Attorney, Agent, or Firm* — McDonnell Boehnen Hulbert & Berghoff LLP

(57) ABSTRACT

A method includes capturing an image of a powder bed with a visible light camera that shares an optical axis with a laser beam. The laser beam is configured for heating the powder bed. The method also includes increasing first intensities of first pixels of the image that are indicative of foreign objects within the image and normalizing second intensities of second pixels of the image that are indicative of uneven illumination of the powder bed. The method also includes processing the image via contrast limited adaptive histogram equalization after increasing the first intensities and after normalizing the second intensities. The method also includes using graph-based image segmentation to identify third pixels of the image that correspond to an area of the powder bed that has been processed by the laser beam and indicating the third pixels via a user interface.

20 Claims, 8 Drawing Sheets

(58) Field of Classification Search

CPC ............ G06T 7/11; G06T 2207/20081; G06T 2207/20084; G06T 7/0012; G06T 2207/10081; G06T 2207/10024; G06T 7/12; G06T 2207/10016; G06T 7/194; G06T 2207/10088; G06T 7/136; G06T 7/10; G06T 7/70; G06T 2207/30004; G06T 2207/30096

USPC ........................................................ 382/266

See application file for complete search history.

(56) References Cited

U.S. PATENT DOCUMENTS

| | | | | |
|---|---|---|---|---|
| 2006/0093235 | A1* | 5/2006 | Takarada | G06T 5/70 382/264 |
| 2016/0098825 | A1* | 4/2016 | Dave | G06V 10/40 419/53 |
| 2018/0200957 | A1* | 7/2018 | Krüger | B33Y 50/00 |
| 2018/0322621 | A1* | 11/2018 | Craeghs | G06T 7/001 |
| 2019/0255654 | A1* | 8/2019 | Beckett | B23K 26/0643 |
| 2020/0183298 | A1* | 6/2020 | Kuno | B23K 26/0884 |
| 2020/0221055 | A1* | 7/2020 | Surana | H04N 7/183 |
| 2020/0316720 | A1* | 10/2020 | Liu | G01B 11/303 |
| 2021/0229357 | A1* | 7/2021 | Yang | B29C 64/371 |
| 2024/0042691 | A1* | 2/2024 | Buls | B22F 12/90 |

OTHER PUBLICATIONS

P. Lott, H. Schleifenbaum, W. Meiners, K. Wissenbach, C. Hinke, J. Buitmann. Design of an optical system for the in situ process monitoring of selective laser melting (slm). Physics Procedia, vol. 12, pp. 683-690, 2011.

B. Foster, E. Reutzel, A. Nassar, B. Hall, S. Brown, C. Dickman. Optical, layerwise monitoring of powder bed fusion. Solid Freeform Fabrication Symposium, Austin, TX, Aug. 2015, pp. 10-12.

S. Kleszczynski, J. Zur Jacobsmühlen, J. Sehrt, G. Witt. Error detection in laser beam melting systems by high resolution imaging. Proceedings of the 23rd Annual International Solid Freeform Fabrication Symposium, vol. 2012, 2012.

D. Buchbinder, W. Meiners, N. Pirch, K. Wissenbach, J. Schrage. Investigation on reducing distortion by preheating during manufacture of aluminum components using selective laser melting. Journal of Laser Applications, vol. 26, No. 1, p. 012004, 2014.

B. Lane, S. Moylan, E.P. Whitenton, L. Ma. Thermographic measurements of the commercial laser powder bed fusion process at nist. Rapid Prototyping Journal, vol. 22, No. 5, pp. 778-787, 2016.

D. Bourell, M. Leu, D. Rosen. Roadmap for additive manufacturing-identifying the future of freeform processing. The University of Texas at Austin, Laboratory for Freeform Fabrication, Advanced Manufacturing Center, vol. 32, 2009.

M. Mani , S. Feng, B. Lane, A. Donmez, S. Moylan, R. Fesperman. Measurement science needs for real-time control of additive manufacturing powder bed fusion processes/ National Institute of Standards and Technology, U.S. Department of Commerce, 2015.

T.G. Spears, S.A. Gold. In-process sensing in selective laser melting (slm) additive manufacturing. Integrating Materials and Manufacturing Innovation, vol. 5, No. 1, pp. 16-40, 2016.

N. Gupta, C. Weber, S. Newsome. Additive manufacturing: status and opportunities. Science and Technology Policy Institute, Washington, D.C., 2012.

W.E. Frazier,. Metal additive manufacturing: a review. Journal of Materials Engineering and performance, vol. 23, No. 6, pp. 1917-1928, 2014.

W.E. Frazier. Direct digital manufacturing of metallic components: vision and roadmap. 21st Annual International Solid Freeform Fabrication Symposium, Austin, TX, Aug. 2010, pp. 9-11.

S. Berumen, F. Bechmann, S. Lindner, J.P. Kruth, T. Craeghs. Quality control of laser-and powder bed-based additive manufacturing (am) technologies. Physics Procedia, vol. 5, pp. 617-622, 2010.

K. Zuiderveld. Contrast limited adaptive histogram equalization. Graphics Gems, pp. 474-485, 1994.

P.F. Felzenszwalb, D.P. Huttenlocher. Efficient graph-based image segmentation. International Journal of Computer Vision, vol. 59, No. 2, pp. 167-181, 2004.

C. Boncelet. Image noise models. The Essential Guide to Image Processing. Elsevier, 2009, pp. 143-167.

A. Gebhardt. Generative Fertigungsverfahren—Rapid Prototyping—Rapid Tooling—Rapid Manufacturing, 3. Edition, Munich, Hanser Publishing, 2007.

T. Diller, R. Sreenivasan, J. Beaman, D. Bourell, J. LaRocco. Thermal model of the build environment for polyamide powder selective laser sintering. Bourell, D. (Editor), Proceedings of the 21st Annual International Solid Freeform Fabrication Symposium (SSF 2010), The University of Texas at Austin 2010, pp. 539-548.

S. Kolossov, E. Boillat, R. Glardon, P. Fischer, M. Locher. 3D FE simulation for temperature evolution in the selective laser sintering process. International Journal of Machine Tools & Manufacture, 44 (2004), pp. 117-123 .

F.E. Wiria, K.F. Leong, C.K. Chua. Modeling of powder particle heat transfer process in selective laser sintering for fabricating tissue engineering scaffolds. Rapid Prototyping Journal, 16 (2010) 6, pp. 400-410.

J.P. Kruth, P. Mercelis, J. Van Vaerenbergh, T. Craeghs. Feedback control of selective laser melting. J.P Bartolo, et al. (Eds.). Virtual and Rapid Manufacturing—Advanced Research in Virtual and Rapid Prototyping: Taylor and Francis 2007, pp. 521-527.

T. Craeghs, F. Bechmann, S. Bernmen, J.P. Kruth. Feedback control of layerwise laser melting using optical sensors. Physics Procedia, 5 (2010), pp. 505-514.

S. Berumen, F. Bechmann, D. Lindner, J.P. Kruth, T. Craeghs. Quality control of laser- and powder bed-based additive manufacturing (AM) technologies. Physics Procedia, 5 (2010), pp. 617-622.

Y. Chivel, I. Smurov. On-line temperature monitoring in selective laser sintering/melting. Physics Procedia, 5 (2010), pp. 515-521.

D. Drummer, D. Rietzel, F. Kühnlein. Development of a characterization approach for the sintering behavior of new thermoplastics for selective laser sintering. Physics Procedia, 5 (2010), pp. 533-542.

P.B. Bacchewar, S.K. Singhal, P.M. Pandey. Statistical modeling and optimization of surface roughness in the selective laser sintering process. Proceedings of the Institution of Mechanical Engineers, Part B: Journal of Engineering Manufacture, 221 (2007) 1, pp. 35-52.

W. Kaddar. Die generative Fertigung mittels Laser-Sintem: Scanstrategien, Einfllusse verschiedener Prozessparameter auf die mechanischen und optischen Eigenschaften beim LS von Thermoplasten und deren Nachbearbeitungsmoglichkeiten. PhD thesis, University of Duisburg-Essen, 2010.

A. Wegner, G. Witt. Process monitoring in laser sintering using thermal imaging. 22nd Annual International Solid Freeform Fabrication Symposium—An Additive Manufacturing Conference, SFF 2011.

\* cited by examiner

```
┌─────────────────────────────────────────────────────┐
│ CAPTURING AN IMAGE OF A POWDER BED WITH A VISIBLE   │
│ LIGHT CAMERA THAT SHARES AN OPTICAL AXIS WITH A     │
│ LASER BEAM, WHEREIN THE LASER BEAM IS CONFIGURED    │
│ FOR HEATING THE POWDER BED                          │
└─────────────────────────────────────────────────────┘
         402 ↓

┌─────────────────────────────────────────────────────┐
│ INCREASING FIRST INTENSITIES OF FIRST PIXELS OF THE │
│ IMAGE THAT ARE INDICATIVE OF FOREIGN OBJECTS        │
│ WITHIN THE IMAGE                                    │
└─────────────────────────────────────────────────────┘
         404 ↓

┌─────────────────────────────────────────────────────┐
│ NORMALIZING SECOND INTENSITIES OF SECOND PIXELS OF  │
│ THE IMAGE THAT ARE INDICATIVE OF UNEVEN             │
│ ILLUMINATION OF THE POWDER BED                      │
└─────────────────────────────────────────────────────┘
         406 ↓

┌─────────────────────────────────────────────────────┐
│ PROCESSING THE IMAGE VIA CONTRAST LIMITED ADAPTIVE  │
│ HISTOGRAM EQUALIZATION AFTER INCREASING THE FIRST   │
│ INTENSITIES AND AFTER NORMALIZING THE SECOND        │
│ INTENSITIES                                         │
└─────────────────────────────────────────────────────┘
         408 ↓

┌─────────────────────────────────────────────────────┐
│ USING GRAPH-BASED IMAGE SEGMENTATION TO IDENTIFY    │
│ THIRD PIXELS OF THE IMAGE THAT CORRESPOND TO AN     │
│ AREA OF THE POWDER BED THAT HAS BEEN PROCESSED BY   │
│ THE LASER BEAM                                      │
└─────────────────────────────────────────────────────┘
         410 ↓

┌─────────────────────────────────────────────────────┐
│ INDICATING THE THIRD PIXELS VIA A USER INTERFACE    │
└─────────────────────────────────────────────────────┘
         412 ↓
```

METHOD FOR SEGMENTING IMAGES

CROSS REFERENCE TO RELATED APPLICATION

The present application is a non-provisional application claiming priority to U.S. provisional application No. 63/176,737, filed Apr. 19, 2021, the contents of which are hereby incorporated by reference.

STATEMENT REGARDING FEDERALLY SPONSORED RESEARCH OR DEVELOPMENT

This invention was made with government support under Grant Nos. 1750027 and 1953155, awarded by the National Science Foundation (NSF). The government has certain rights in the invention.

BACKGROUND

Laser powder bed fusion (LPBF) has demonstrated a wide range of competitive advantages over conventional manufacturing methods. LPBF has also shown the potential of producing parts with lighter weights and reduced components. Despite the capabilities and emerging applications of LPBF, issues of reliability and reproducibility remain. LPBF is sensitive to disturbances in input process parameters such as laser power, laser scan path, and scan speed. Unpredictable process variations can result in various manufacturing defects.

SUMMARY

A first example includes a method comprising: capturing an image of a powder bed with a visible light camera that shares an optical axis with a laser beam, wherein the laser beam is configured for heating the powder bed; increasing first intensities of first pixels of the image that are indicative of foreign objects within the image; normalizing second intensities of second pixels of the image that are indicative of uneven illumination of the powder bed; processing the image via contrast limited adaptive histogram equalization after increasing the first intensities and after normalizing the second intensities; using graph-based image segmentation to identify third pixels of the image that correspond to an area of the powder bed that has been processed by the laser beam; and indicating the third pixels via a user interface.

A second example includes a non-transitory computer readable medium storing instructions that, when executed by a computing device, cause the computing device to perform functions comprising: capturing an image of a powder bed with a visible light camera that shares an optical axis with a laser beam, wherein the laser beam is configured for heating the powder bed; increasing first intensities of first pixels of the image that are indicative of foreign objects within the image; normalizing second intensities of second pixels of the image that are indicative of uneven illumination of the powder bed; processing the image via contrast limited adaptive histogram equalization after increasing the first intensities and after normalizing the second intensities; using graph-based image segmentation to identify third pixels of the image that correspond to an area of the powder bed that has been processed by the laser beam; and indicating the third pixels via a user interface.

A third example includes a computing device comprising: one or more processors; and a computer readable medium storing instructions that, when executed by a computing device, cause the computing device to perform functions comprising: capturing an image of a powder bed with a visible light camera that shares an optical axis with a laser beam, wherein the laser beam is configured for heating the powder bed; increasing first intensities of first pixels of the image that are indicative of foreign objects within the image; normalizing second intensities of second pixels of the image that are indicative of uneven illumination of the powder bed; processing the image via contrast limited adaptive histogram equalization after increasing the first intensities and after normalizing the second intensities; using graph-based image segmentation to identify third pixels of the image that correspond to an area of the powder bed that has been processed by the laser beam; and indicating the third pixels via a user interface.

Also incorporated by reference herein is: T. Jiang, M. Leng, and X. Chen, "Control-Oriented In Situ Imaging and Data Analytics for Coaxial Monitoring of Powder Bed Fusion Additive Manufacturing," in Progress in Additive Manufacturing 2020, ed. N. Shamsaei and M. Seifi (West Conshohocken, PA: ASTM International, 2022), 193-207. http://doi.org/10.1520/STP163720200104.

When the term "substantially" or "about" is used herein, it is meant that the recited characteristic, parameter, or value need not be achieved exactly, but that deviations or variations, including, for example, tolerances, measurement error, measurement accuracy limitations, and other factors known to those of skill in the art may occur in amounts that do not preclude the effect the characteristic was intended to provide. In some examples disclosed herein, "substantially" or "about" means within +/−0-5% of the recited value.

These, as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible.

BRIEF DESCRIPTION OF THE DRAWINGS

FIG. 12 is a block diagram of a method, according to an example embodiment.

DETAILED DESCRIPTION

Improved techniques for monitoring LPBF in-situ or ex-situ are needed. To this end, this disclosure includes example methods and devices related to monitoring LPBF and/or evaluating the results of LPBF.

A method includes capturing an image of a powder bed with a visible light camera that shares an optical axis with a laser beam. For example, the visible light camera captures the image of the powder bed while or shortly after the laser beam is heating and/or fusing the powder bed. The method also includes increasing first intensities of first pixels of the image that are indicative of foreign objects within the image. For instance, a grayscale closing process is used to increase the first intensities of the first pixels. The method also includes normalizing second intensities of second pixels of the image that are indicative of uneven illumination of the powder bed. For example, the second pixels are normalized by flat-field correction. The method also includes processing the image via contrast limited adaptive histogram equalization (CLAHE) after increasing the first intensities and after normalizing the second intensities. Using CLAHE can yield enhanced contrast between fused areas and non-fused areas of the powder bed. The method also includes using graph-based image segmentation to identify third pixels of the image that correspond to an area of the powder bed that has been processed by the laser beam. The method also includes indicating the third pixels via a user interface.

Figure 1:
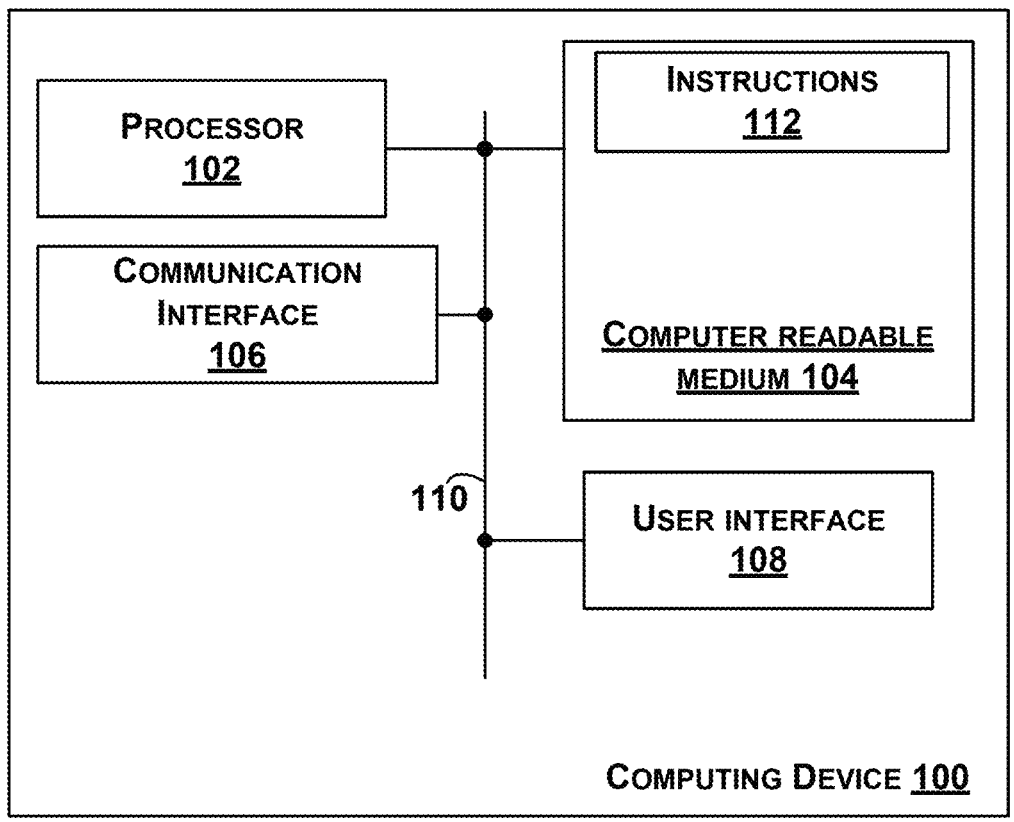
FIG. 1 is a schematic diagram of a computing device, according to an example embodiment.

FIG. 1 is a block diagram of a computing device 100. The computing device 100 includes one or more processors 102, a non-transitory computer readable medium 104, a communication interface 106, and a user interface 108. Components of the computing device 100 are linked together by a system bus, network, or other connection mechanism 110.

The one or more processors 102 can be any type of processor(s), such as a microprocessor, a field programmable gate array, a digital signal processor, a multicore processor, etc., coupled to the non-transitory computer readable medium 104.

The non-transitory computer readable medium 104 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 104 can store instructions 112. The instructions 112 are executable by the one or more processors 102 to cause the computing device 100 to perform any of the functions or methods described herein.

The communication interface 106 can include hardware to enable communication within the computing device 100 and/or between the computing device 100 and one or more other devices. The hardware can include any type of input and/or output interfaces, a universal serial bus (USB), PCI Express, transmitters, receivers, and antennas, for example. The communication interface 106 can be configured to facilitate communication with one or more other devices, in accordance with one or more wired or wireless communication protocols. For example, the communication interface 106 can be configured to facilitate wireless data communication for the computing device 100 according to one or more wireless communication standards, such as one or more Institute of Electrical and Electronics Engineers (IEEE) 801.11 standards, ZigBee standards, Bluetooth standards, etc. As another example, the communication interface 106 can be configured to facilitate wired data communication with one or more other devices. The communication interface 106 can also include analog-to-digital converters (ADCs) or digital-to-analog converters (DACs) that the computing device 100 can use to control various components of the computing device 100 or external devices.

The user interface 108 can include any type of display component configured to display data. As one example, the user interface 108 can include a touchscreen display. As another example, the user interface 108 can include a flat-panel display, such as a liquid-crystal display (LCD) or a light-emitting diode (LED) display. The user interface 108 can include one or more pieces of hardware used to provide data and control signals to the computing device 100. For instance, the user interface 108 can include a mouse or a pointing device, a keyboard or a keypad, a microphone, a touchpad, or a touchscreen, among other possible types of user input devices. Generally, the user interface 108 can enable an operator to interact with a graphical user interface (GUI) provided by the computing device 100 (e.g., displayed by the user interface 108).

Figure 2:
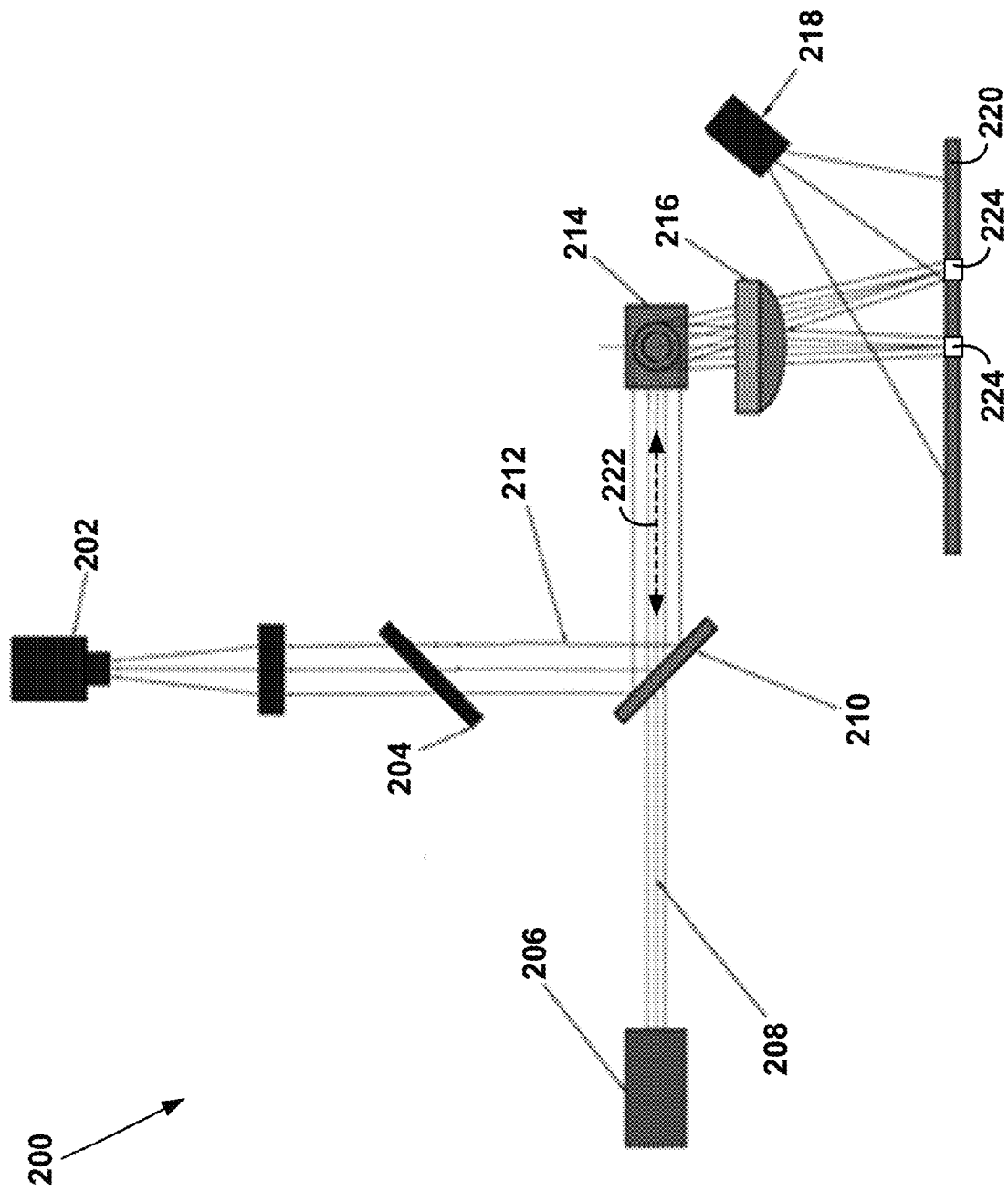
FIG. 2 is a schematic diagram of a laser powder bed fusion system, according to an example embodiment.

FIG. 2 is a schematic diagram of a laser powder bed fusion system 200 (LPBF 200). The LPBF 200 includes a camera 202, a beamsplitter 204, a laser 206 emitting a laser beam 208, a dichroic mirror 210 reflecting light 212 from a powder bed 220 to the camera 202, a galvo scanner 214, a lens 216, and a light source 218, such as a lamp.

The computing device 100 is configured to control the components of the LPBF 200, such as the camera 202, the laser 206, the galvo scanner 214, and/or the light source 218. For example, the computing device 100 uses the communication interface 106 to control the LPBF 200.

The camera 202 is configured to capture images of light within the visible spectrum, that is, wavelengths ranging approximately from 380 nm to 750 nm. As shown, the camera 202 shares an optical axis 222 with the laser 206 and the laser beam 208. Specifically, the camera 202 is aligned to capture images of the powder bed 220.

The laser 206 emits the laser beam 208 which is transmitted by the dichroic mirror 210 to the galvo scanner 214. The galvo scanner 214 scans or reflects the laser beam across the powder bed 220 in a predetermined path. The lens 216 focuses the laser beam 208 to form a laser spot 224 that heats or fuses the powder bed 220. The light source 218 illuminates the powder bed 220 and light 212 reflected by the powder bed 220 is directed to the camera 202. The powder bed 220 includes a powdered material such as metal that is fusible by the laser beam 208.

Figure 3:
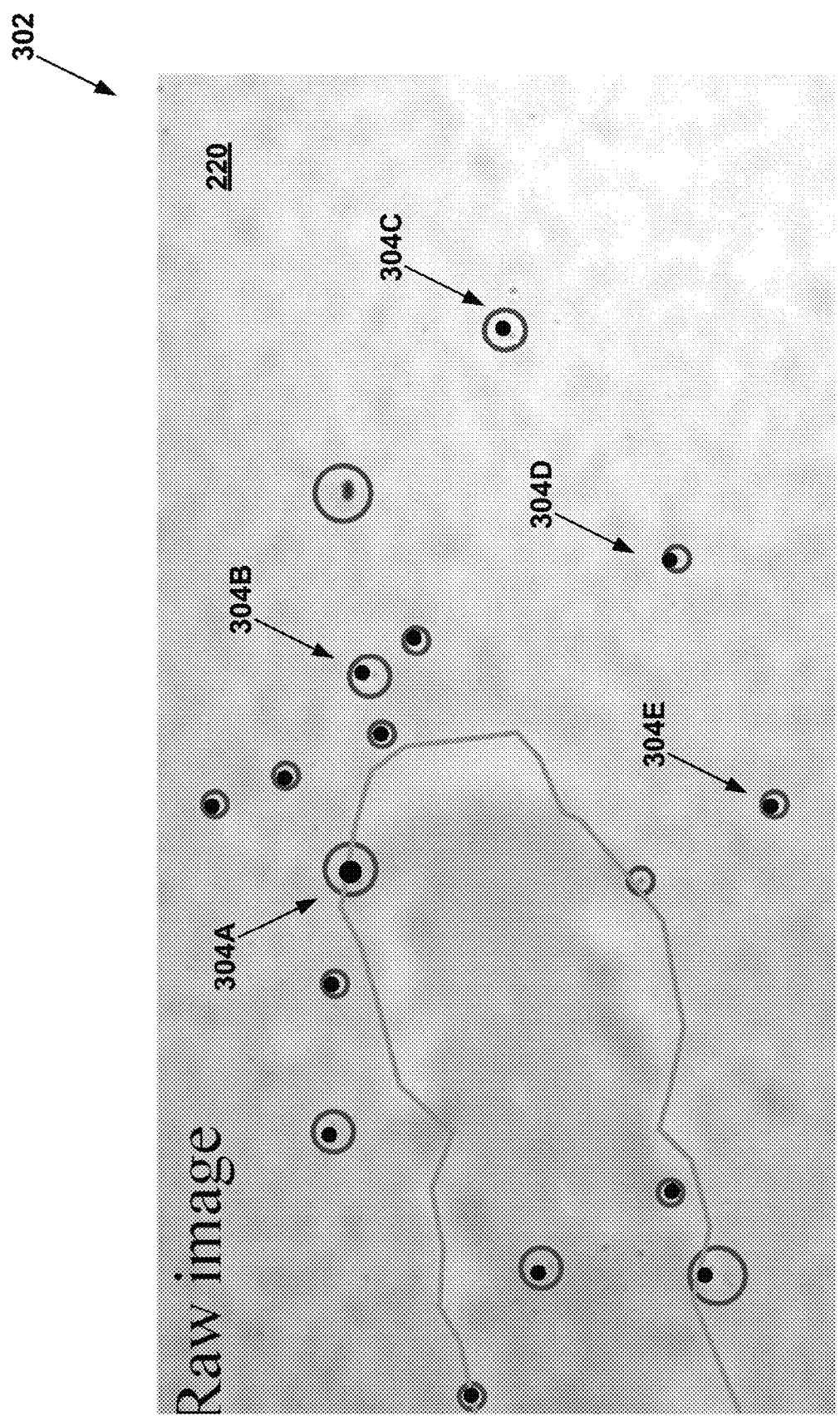
FIG. 3 is a grayscale image depicting a powder bed, according to an example embodiment.

FIG. 3 shows a grayscale image of the powder bed 220. The camera 202 captures an image 302 of the powder bed 220. Due to the alignment of the camera 202 and the laser 206, the center of the image 302 corresponds to the laser spot 224 on the powder bed 220 and/or a center of the laser beam 208 that heats the powder bed 220. As shown, the image 302 includes pixels 304A, 304B, 304C, 304D, and 304E that represent foreign objects (e.g., dust particles or spatter) on the powder bed 220, or on optical components such as the camera 202, the beamsplitter 204, the dichroic mirror 210, the galvo scanner 214, the lens 216, or the light source 218.

Next, the image 302 is processed by the computing device 100. More specifically, the computing device 100 increases intensities of the pixels 304A, 304B, 304C, 304D, and 304E that are indicative of the foreign objects within the image 302. Taking an 8-bit grayscale as an example, the computing device increases the intensity values of the pixels 304A, 304B, 304C, 304D, and 304E along the 0 to 255 scale. As a result, the pixels 304A, 304B, 304C, 304D, and 304E have an enhanced brightness that reduces the prominence of the foreign objects within the image 302.

More specifically, the computing device 100 uses a grayscale closing process to increase the intensities of the pixels 304A, 304B, 304C, 304D, and 304E. As such, the computing device 100 determines that (1) the intensities of the pixels 304A, 304B, 304C, 304D, and 304E each include one or more local minima with respect to intensity values of surrounding pixels and (2) that each group of the pixels 304A, 304B, 304C, 304D, and 304E define an area that is less than a threshold area. In some examples, the computing device 100 specifically determines that each of the groups of pixels 304A, 304B, 304C, 304D, and 304E has a collective area that fits within a circle having the threshold area. Thus, the computing device 100 increases the intensities of the pixels 304A, 304B, 304C, 304D, and 304E to be equal to the intensity of the surrounding pixels.

The amount of pixels of the threshold area can be equivalent to a circular area that is smaller than 10% of the diameter of laser spot 224, for example.

For example, the nominal diameter of the laser spot 224 (e.g., 0.5 mm), which is a function of the optical path (specifically, laser beam 208, the focus lens 216, and the distance between the scanner and powder bed). The threshold area can be up to 10% of the size of the laser spot 224 in some examples. The lower limit of the threshold area could be the observed maximum size of any foreign object in the optical path.

Figure 4:
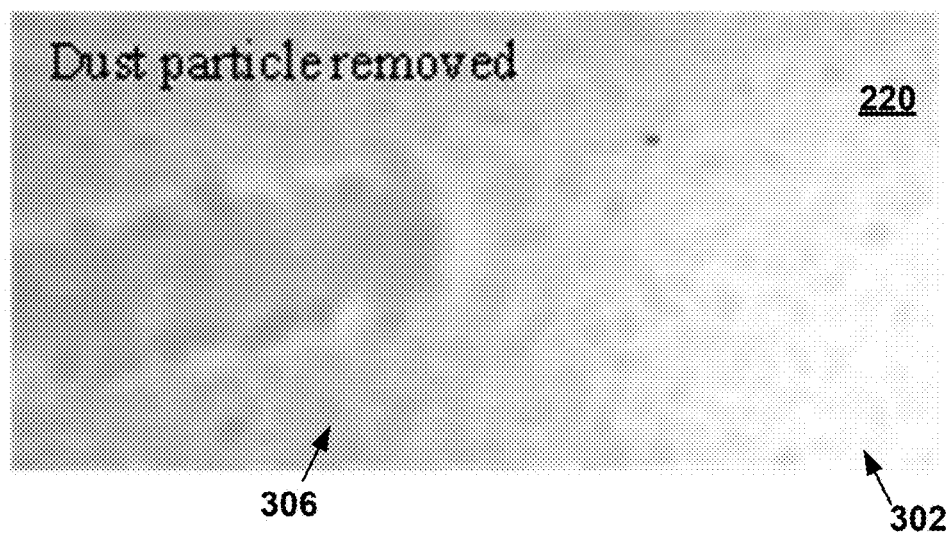
FIG. 4 is a grayscale image depicting a powder bed, according to an example embodiment.

FIG. 4 shows the result of the grayscale closing process, namely the image 302 with the foreign objects largely removed from the image 302. The computing device 100 normalizes intensities of pixels 306 of the image 302 that are indicative of uneven illumination of the powder bed 220. That is, some pixels of the image 302 are illuminated more brightly than others, due to the position, orientation, intensity distribution, and size of the light source 218. In FIG. 4, the image 302 has pixels more brightly illuminated in the lower right corner. The pixels 306 affected by uneven illumination are typically not localized, as uneven illumination of the powder bed 220 can affect any or all pixels of the image 302. The computing device 100 generally normalizes the intensities of the pixels 306 via flat-field correction (FFC).

The FFC algorithm starts with estimating a flat field image, which represents the background intensity representing the light source 218. With the estimated flat field image, each second pixel 306 of the image 302 is adjusted. The flat-field image is estimated by surface fitting a mathematical model on the intensity profile of the image 302. The model is fit on a sampled grid of the pixels 306. The accuracy of the fit is higher when the polynomial model degree or sampling grid size is higher, but the amount of time to estimate the flat field image will increase.

Figure 5:
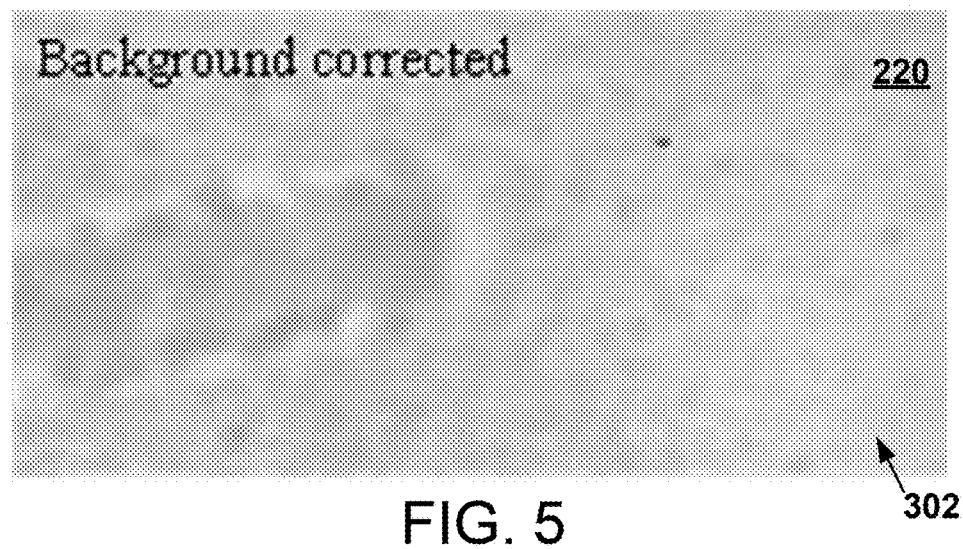
FIG. 5 is a grayscale image depicting a powder bed, according to an example embodiment.

FIG. 5 shows the result of the FFC process, namely the image 302 with the effects of uneven illumination equalized via normalizing the pixels 306. Next, the computing device 100 processes the image 302 via contrast limited adaptive histogram equalization (CLAHE) after increasing the intensities of the pixels 304 and after normalizing the intensities of the pixels 306.

Conventional adaptive histogram equalization (AHE) typically over-amplifies the contrast in near-constant regions of an image, since the histogram in such regions is highly concentrated. As a result, AHE can cause noise to be amplified in near-constant regions. Contrast Limited AHE (CLAHE) is a type of adaptive histogram equalization in which the contrast amplification is limited, which reduces this problem of noise amplification. CLAHE involves increasing the intensity of bright pixels and decreasing the intensity of dark pixels to increase overall contrast by better mapping an image to the full grayscale (e.g., 0 to 255 in an 8-bit example). CLAHE can be particularly useful for enhancing the contrast between processed portions of the powder bed 220 and unprocessed or incompletely processed portions of the powder bed 220.

Figure 6:
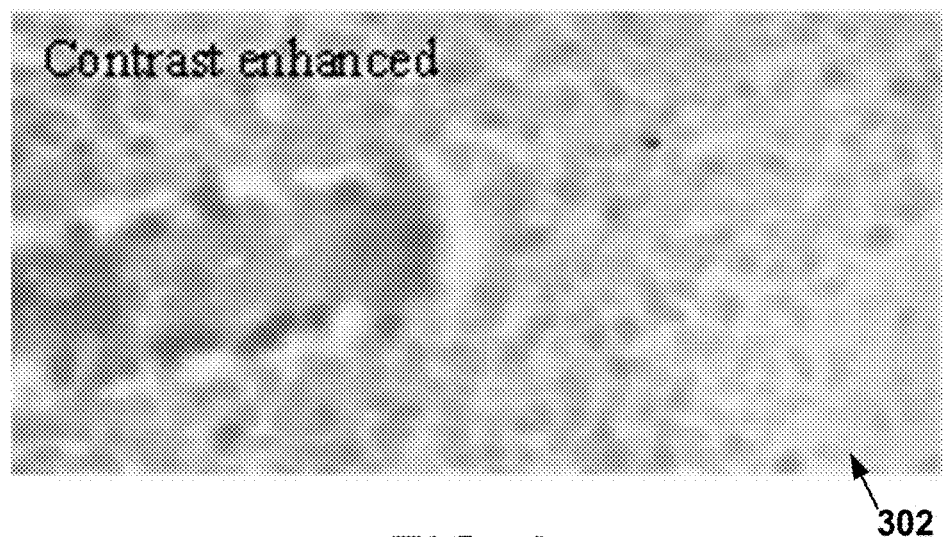
FIG. 6 is a grayscale image depicting a powder bed, according to an example embodiment.

FIG. 6 shows the result of the CLAHE process, namely the image 302 with enhanced contrast.

Figure 7:
FIG. 7 is a grayscale image depicting a powder bed, according to an example embodiment.
Figure 8:
FIG. 8 shows a segmented image, according to an example embodiment.

FIG. 7 shows a display of the user interface 108 displaying another example of the image 302 after processing via the CLAHE process. As shown in FIG. 8, the computing device 100 uses graph-based image segmentation to identify pixels of the image 302 that correspond to an area 310 of the powder bed 220 that has been processed by the laser beam 208 (e.g., by the laser beam 208 moving the laser spot 224 left to right over the powder bed 220). The computing device 100 additionally identifies areas 312, 314, 316, 318, 320, 322, and 324 of the powder bed 220, which correspond respectively to distinct sets of pixels. The segmentation of the pixel sets is based on grayscale pixel intensity and is indicated by varying the colors of each pixel set when displayed by the user interface 108, for example. The graph-based image segmentation process is described in more detail below.

In graph-based image segmentation, the image 302 from FIG. 7 is transformed into a graph G=(V, E), where each node $v_i \in V$ corresponds to a pixel in the image, and the edges $(v_i, v_j) \in E$ connect certain pairs of neighboring pixels. A weight $w([v_i, v_j])$ is associated with each edge, which is defined as the absolute grayscale difference between elements $v_i$ and $v_j$.

The algorithm output is a segmentation $S=(C_1, C_2, \ldots, C_r)$ as a partition of V into r components such that elements within a component are similar, and elements in different components are dissimilar. Mathematically, this similarity or dissimilarity is characterized by the metrics internal difference and inter-component difference. The internal difference of a component $C \in V$ is the largest weight in the minimum spanning tree of that component, as shown in equation (1)

$$Int(C) = \max_{v_i, v_k \in C, (v_i, v_k) \in E} w([v_i, v_k]) \qquad (1)$$

and the inter-component difference between $C_1, C_2 \in V$ is the minimum weight edge connecting the two components, as shown in equation (2)

$$Dif(C_1, C_2) = \min_{v_i \in C_1, v_j \in C_2, (v_i, v_j) \in E} w([v_i, v_j]) \qquad (2)$$

A boundary between a pair of components $C_1$ and $C_2$, can be identified if $Dif(C_1, C_2)$ is large relative to the internal difference within at least one of the components, $Int(C_1)$ and $Int(C_2)$. Therefore, a pairwise comparison predicate is defined as shown in equation (3)

$$D(C_1, C_2) = \begin{cases} \text{true, if } Dif(C_1, C_2) > MInt(C_1, C_2) \\ \text{false, otherwise} \end{cases} \qquad (3)$$

where $MInt(C_1, C_2) = \min(Int(C_1)+\tau(C_1), Int(C_2)+\tau(C_2))$.

The threshold function τ controls the degree to which the difference between two components must be greater than their internal differences. For small components, Int(C) is typically not a good estimate of the local characteristics of the data. In the extreme case, when |C|=1 (there is only one pixel in the component), Int(C)=0. Therefore, the method uses a threshold function based on the size of the component, $$\tau(C)=k/|C|$$

where |C| denotes the size of C, and k is some constant parameter. That is, for small components the method generally requires stronger evidence for a boundary.

In practice, k sets a scale of observation, in that a larger k requires a sufficiently significant difference between neighboring components for there to be a boundary. Therefore, a larger k causes a preference for larger components.

Another parameter that affects the segmentation result is MCS (minimum component size). It sets the lower limit of the component size. After segmentation, if a component is smaller than MCS, it is merged to one of its neighboring components, which has the least inter-component difference with it. This is performed repeatedly until there is no component that is smaller than MCS.

The computing device 100 can estimate the size (e.g., width) of the processed zone of the powder bed 220 using the scan vector length and previously obtained processed zone width (from a previously captured image) and set the MCS as a value that is slightly smaller than the estimated processed zone (e.g., 80%). This will help correctly yield the processed zone as a single component.

Thus, the graph-based image segmentation process yields the image 302 segmented as shown in FIG. 8. Information from the image in FIG. 8 can then be presented via the user interface 108. For example, the computing device 100 determines an average width of the area 310 perpendicular to known path of the laser beam 208 and/or the laser spot 224 (e.g., by averaging widths sampled at several horizontal positions in the image 302) and provides, via the user interface 108, an indication of whether the average width is within a predetermined (e.g., expected) range of width. For example, the user interface 108 could use audio to convey that information or could display the information.

In another example, the computing device 100 determines a variance of the width of the area 310 sampled at several horizontal positions in the image 302 and provides, via the user interface 108, an indication of whether the variance is within a predetermined (e.g., expected) range of variance. For example, the user interface 108 could use audio to convey that information or could display the information.

In another example, the computing device 100 determines a perimeter and a length of the area 310 along the travel direction of the laser spot 224, calculates a metric based on the perimeter and the length (e.g., a ratio of the perimeter to the length or vice versa), and provides, via the user interface 108, an indication of whether the metric is within a predetermined (e.g., expected) range of the metric. For example, the user interface 108 could use audio to convey that information or could display the information.

In some examples, a corrective step is performed where a melting pool 326 of the powder bed 220 is manually added to the area 310 from another segmented area (e.g., the area 322) because, although the melting pool 326 has been processed by the laser beam 208, the melting pool 326 has not yet had the time to completely change from the liquid phase to the solid phase and have a pixel intensity profile similar to that of the rest of the area 310. As such, the computing device 100 uses a known size of the laser spot 224 and a location of the laser spot 224 that corresponds to the optical axis 222 of the visible light camera 202 in the image 302 to determine that pixels corresponding to the melting pool 326 should be segmented as part of the area 310.

In some examples, the computing device 100 uses an image of the powder bed 220 captured (e.g., immediately) prior to the image 302 to determine (e.g., estimate) the spot size of the laser beam 208 (e.g., the size of the melting pool 326) within the image 302. That is, graph-based image segmentation is used to identify pixels of the previous image corresponding to an area of the powder bed 220 that has been processed by the laser beam 208. The computing device 100 then determines a width of that area within the previous image that corresponds to the spot size of the laser beam 208 (e.g., the size of the melting pool 326) and uses that width to determine the extent of the melting pool 326 within the image 302.

In some examples, the computing device 100 uses the image of the powder bed 220 captured (e.g., immediately) prior to the image 302 to calibrate the graph-based image segmentation process. For instance, the computing device 100 uses graph-based image segmentation, in accordance with a first threshold parameter k, to identify pixels of the previously captured image corresponding to the area of the powder bed 220 that has been processed by the laser beam 208. The computing device 100 also uses graph-based image segmentation, in accordance with a second threshold parameter k, to identify pixels of the previously captured image corresponding to the area of the powder bed 220 that has been processed by the laser beam 208. Next, the computing device 100 determines that the area of the powder bed 220 identified by the process using the first threshold parameter, when compared to the area of the powder bed 220 identified by the process using the second threshold parameter, better conforms to a target area of the powder bed 220 that is expected to be processed by the laser beam 208. Then, when segmenting future images (e.g., the image 302), the computing device 100 uses the first threshold parameter when using graph-based image segmentation to identify the processed area of the powder bed 220.

In some examples, the computing device 100 applies the minimum component size (MCS) setting in performing graph-based image segmentation.

Figure 9:
FIG. 9 shows a segmented image, according to an example embodiment.

Referring to FIG. 9, the computing device 100 uses graph-based image segmentation to segment the image 302 into sets of pixels corresponding respectively to the areas 310, 312, and 328. Next, the computing device 100 determines that the pixels corresponding to the area 328 include less than a threshold amount of pixels (e.g., that the area 328 is less than the minimum component size). In response to that determination, the computing device 100 determines that a first inter-component difference between the pixels of the area 328 and the pixels of the area 310 is less than a second inter-component difference between the pixels of the area 328 and the pixels of the area 312. Accordingly, the computing device 100 includes the area 328 as part of the area 310 when finalizing the segmentation.

Figure 10:
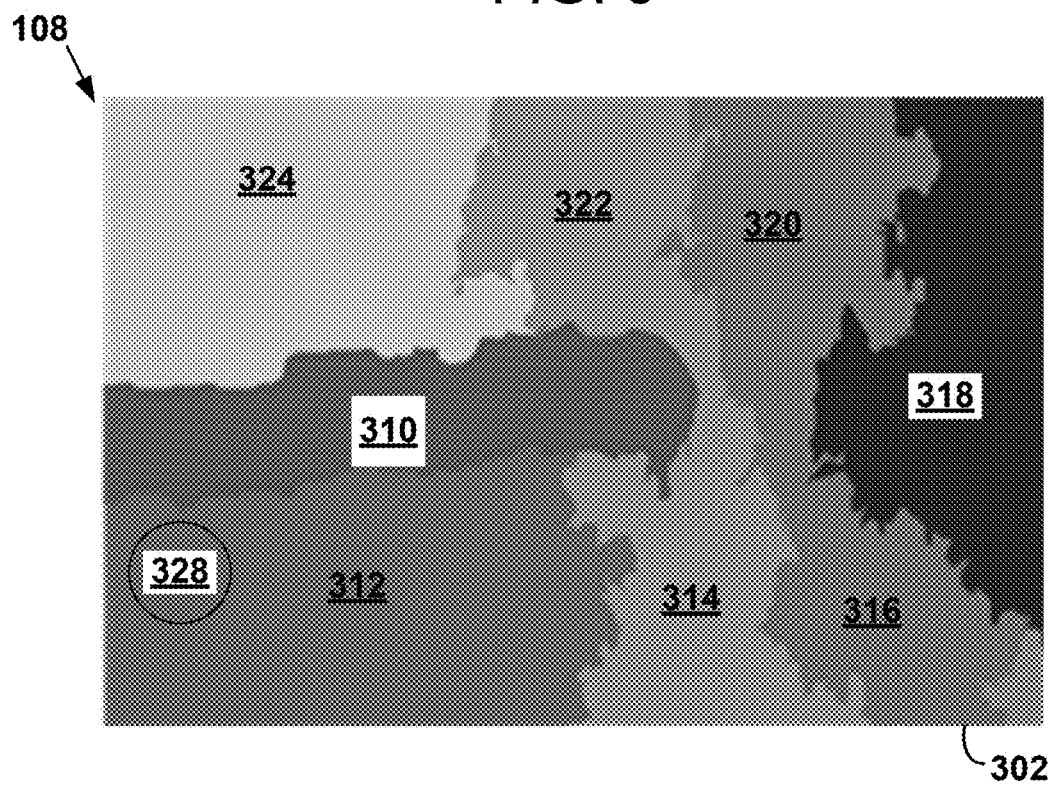
FIG. 10 shows a segmented image, according to an example embodiment.

In another example, the computing device 100 applies the minimum component size (MCS) setting in performing graph-based image segmentation in a different scenario. Referring to FIG. 10, the computing device 100 uses graph-based image segmentation to segment the image 302 into sets of pixels corresponding respectively to the areas 310, 312, and 328. Next, the computing device 100 determines that the pixels corresponding to the area 328 include less than a threshold amount of pixels (e.g., that the area 328 is less than the minimum component size). In response to that determination, the computing device 100 determines that a first inter-component difference between the pixels of the area 328 and the pixels of the area 312 is less than a second inter-component difference between the pixels of the area 328 and the pixels of the area 310. Accordingly, the computing device 100 includes the area 328 as part of the area 312 when finalizing the segmentation.

In the examples shown in FIG. 9 and FIG. 10, the threshold amount of pixels (i.e., the minimum component size) can be calculated based on the width (e.g., size) of the area 310 identified in the image captured prior to the image 302. For example, the threshold amount of pixels could be determined to be equivalent to a circular or rectangular area having a diameter or height equal to 80% of the width of the area 310 and/or a length equal to the length of the area 310 within the image captured prior to the image 302.

Figure 11:
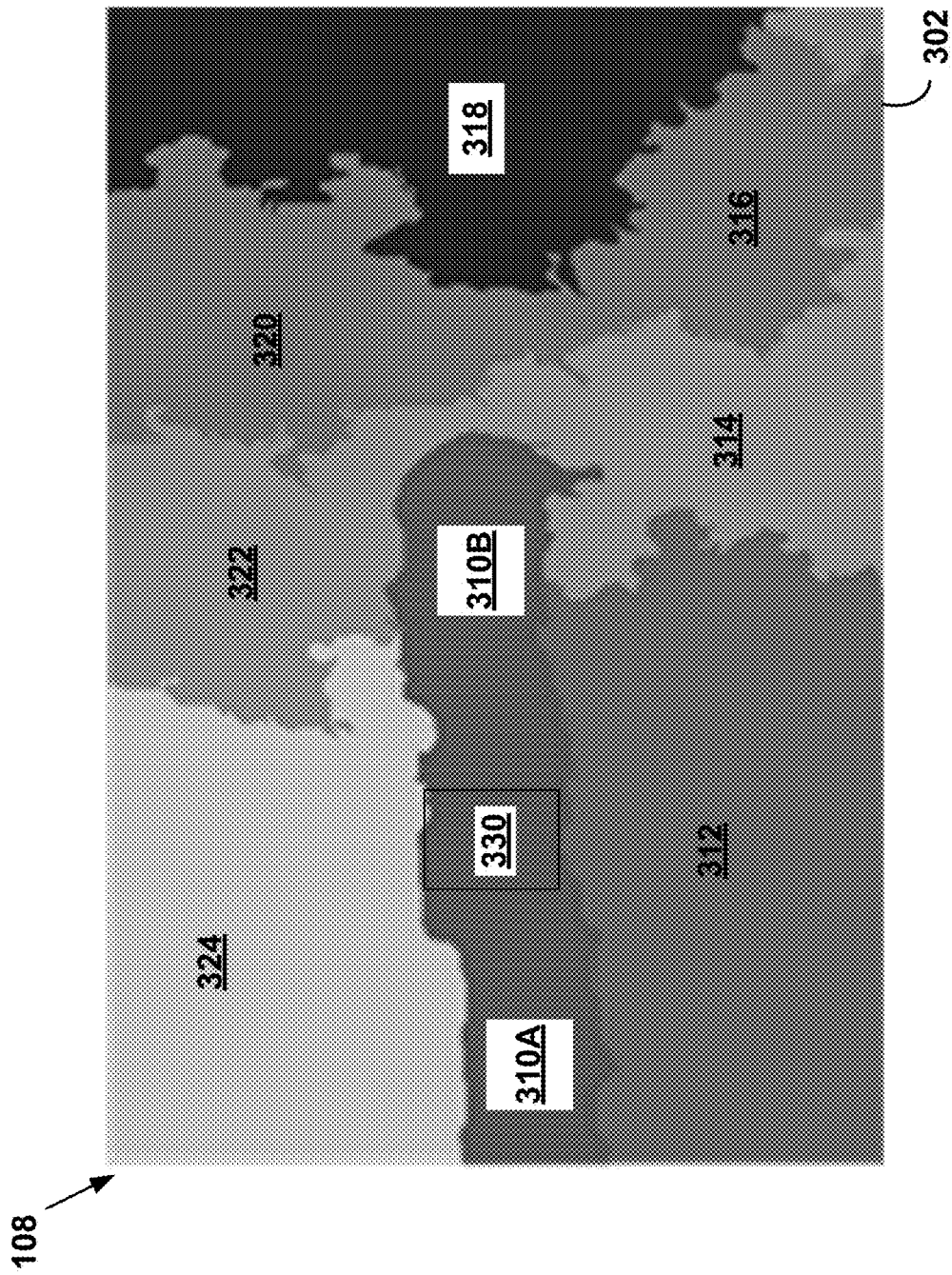
FIG. 11 shows a segmented image, according to an example embodiment.

Referring to FIG. 11, the computing device 100 can also detect a discontinuity defect within the area processed by the laser beam 208, shown as three separate areas 310A, 310B, and 330 in FIG. 11. All three areas are on the traveling path of laser spot 224 in the image 302. As such, the computing device 100 uses graph-based image segmentation to identify a first subset of pixels corresponding to the area 310A and a second subset of pixels corresponding to the area 310B. The areas 310A and 310B have similar grayscale intensity and are segmented into the same segment of the image 302. As shown, the areas 310A and 310B are separated by pixels of the image 302 that correspond to the area 330 of the powder bed that has not been processed substantially similarly to the areas 310A and 310B and has significantly higher intensity. That is, the areas 310A and 310B are determined to have been processed by the laser beam 208 as expected, whereas the area 330 is determined to have been incompletely processed or processed in some unsatisfactory manner that differs from the areas 310A and 310B. Furthermore, the computing device 100 can generate a visual or audio alert of the discontinuity defect, via the user interface 108.

FIG. 12 is a block diagram of a method 400 for segmenting the image 302. As shown in FIG. 12, the method 400 includes one or more operations, functions, or actions as illustrated by blocks 402, 404, 406, 408, 410, and 412. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 402, the method 400 includes capturing the image 302 of the powder bed 220 with the visible light camera 202 that shares the optical axis 222 with the laser beam 208. The laser beam 208 is configured for heating the powder bed 220. This functionality is described above with reference to FIG. 2 and FIG. 3.

At block 404, the method 400 includes increasing first intensities of the first pixels 304 of the image 302 that are indicative of foreign objects within the image 302. This functionality is described above with reference to FIG. 3 and FIG. 4.

At block 406, the method 400 includes normalizing second intensities of second pixels 306 of the image 302 that are indicative of uneven illumination of the powder bed 220. This functionality is described above with reference to FIG. 4 and FIG. 5.

At block 408, the method 400 includes processing the image 302 via contrast limited adaptive histogram equalization after increasing the first intensities and after normalizing the second intensities. This functionality is described above with reference to FIG. 5 and FIG. 6.

At block 410, the method 400 includes using graph-based image segmentation to identify third pixels of the image that correspond to the area 310 of the powder bed 220 that has been processed by the laser beam 208. This functionality is described above with reference to FIG. 7 and FIG. 8.

At block 412, the method 400 includes indicating the third pixels via a user interface 108. This functionality is described above with reference to FIG. 8.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A method comprising:
capturing an image of a powder bed with a visible light camera that shares an optical axis with a laser beam, wherein the laser beam is configured for heating the powder bed;
increasing first intensities of first pixels of the image that are indicative of foreign objects within the image;
normalizing second intensities of second pixels of the image that are indicative of uneven illumination of the powder bed;
processing the image via contrast limited adaptive histogram equalization after increasing the first intensities and after normalizing the second intensities;
using graph-based image segmentation to identify third pixels of the image that correspond to an area of the powder bed that has been processed by the laser beam; and
indicating the third pixels via a user interface.

2. The method of claim 1, further comprising:
making a determination that the first intensities include a local minimum and that the first pixels define an area that is less than a threshold area,
wherein increasing the first intensities comprises increasing the first intensities in response to making the determination.

3. The method of claim 2, wherein the threshold area is less than 10% of a spot size of the laser beam on the powder bed.

4. The method of claim 2, wherein making the determination comprises determining that the first pixels define a circular area that is less than the threshold area.

5. The method of claim 1, wherein increasing the first intensities comprises processing the image via a grayscale closing process.

6. The method of claim 1, wherein normalizing the second intensities comprises processing the image via flat-field correction.

7. The method of claim 1, further comprising identifying fourth pixels of the image that correspond to a melting pool within the powder bed based on a spot size of the laser beam and a location of the laser beam that corresponds with the optical axis of the visible light camera.

8. The method of claim 7, wherein the image is a second image, the method further comprising:
capturing a first image of the powder bed with the visible light camera prior to capturing the second image;

using graph-based image segmentation to identify fifth pixels of the first image corresponding to a second area of the powder bed that has been processed by the laser beam; and determining the spot size of the laser beam in the second image based on a width of the second area in the first image.

9. The method of claim 1, wherein the area is a first area, and wherein using graph-based image segmentation to identify the third pixels comprises identifying a first subset of pixels of the third pixels and a second subset of pixels of the third pixels, wherein the first subset and the second subset are separated by fourth pixels of the image that correspond to a second area of the powder bed that has not been processed substantially similarly to the first area.

10. The method of claim 9, further comprising providing, via a user interface, an alert that the second area of the powder bed separates the first area of the powder bed.

11. The method of claim 1, further comprising:
determining an average width of the area; and
providing, via the user interface, an indication of whether the average width is within a predetermined range of width.

12. The method of claim 1, further comprising:
determining a variance of a width of the area; and
providing, via the user interface, an indication of whether the variance is within a predetermined range of variance.

13. The method of claim 1, further comprising:
determining a perimeter of the area and a length of the area;
calculating a metric based on the perimeter and the length; and
providing, via the user interface, an indication of whether the metric is within a predetermined range of the metric.

14. The method of claim 1, wherein the image is a second image, the method further comprising:
capturing a first image of the powder bed with the visible light camera prior to capturing the second image;
using graph-based image segmentation, in accordance with a first threshold parameter, to identify fourth pixels of the first image corresponding to a second area of the powder bed that has been processed by the laser beam;
using graph-based image segmentation, in accordance with a second threshold parameter, to identify fifth pixels of the first image corresponding to a third area of the powder bed that has been processed by the laser beam; and
determining that the second area of the powder bed, when compared to the third area of the powder bed, better conforms to a target area of the powder bed that is expected to be processed by the laser beam,
wherein using graph-based image segmentation to identify the third pixels of the second image comprises using graph-based image segmentation in accordance with the first threshold parameter.

15. The method of claim 1, wherein using graph-based image segmentation to identify the third pixels comprises:
segmenting the image into fourth pixels, fifth pixels, and sixth pixels;
determining that the fifth pixels include less than a threshold amount of pixels; and
determining that a first inter-component difference between the fourth pixels and the fifth pixels is less than a second inter-component difference between the fifth pixels and the sixth pixels,
wherein using graph-based image segmentation to identify the third pixels comprises identifying the fourth pixels and the fifth pixels as the third pixels.

16. The method of claim 15, wherein the image is a second image, the method further comprising:
capturing a first image of the powder bed with the visible light camera prior to capturing the second image;
using graph-based image segmentation to determine a width of a second area of the powder bed within the first image that has been processed by the laser beam; and
prior to determining that the fifth pixels include less than the threshold amount of pixels, determining the threshold amount of pixels based on the width of the second area.

17. The method of claim 1, wherein using graph-based image segmentation to identify the third pixels comprises:
segmenting the image into fourth pixels, fifth pixels, and sixth pixels;
determining that the fifth pixels include less than a threshold amount of pixels; and
determining that a first inter-component difference between the fourth pixels and the fifth pixels is less than a second inter-component difference between the fifth pixels and the sixth pixels,
wherein using graph-based image segmentation to identify the third pixels comprises identifying the sixth pixels as the third pixels.

18. The method of claim 17, wherein the image is a second image, the method further comprising:
capturing a first image of the powder bed with the visible light camera prior to capturing the second image;
using graph-based image segmentation to determine a width of a second area of the powder bed within the first image that has been processed by the laser beam; and
prior to determining that the fifth pixels include less than the threshold amount of pixels, determining the threshold amount of pixels based on the width of the second area.

19. A non-transitory computer readable medium storing instructions that, when executed by a computing device, cause the computing device to perform functions comprising:
capturing an image of a powder bed with a visible light camera that shares an optical axis with a laser beam, wherein the laser beam is configured for heating the powder bed;
increasing first intensities of first pixels of the image that are indicative of foreign objects within the image;
normalizing second intensities of second pixels of the image that are indicative of uneven illumination of the powder bed;
processing the image via contrast limited adaptive histogram equalization after increasing the first intensities and after normalizing the second intensities;
using graph-based image segmentation to identify third pixels of the image that correspond to an area of the powder bed that has been processed by the laser beam; and
indicating the third pixels via a user interface.

20. A computing device comprising:
one or more processors; and
a non-transitory computer readable medium storing instructions that, when executed by a computing device, cause the computing device to perform functions comprising:
capturing an image of a powder bed with a visible light camera that shares an optical axis with a laser beam, wherein the laser beam is configured for heating the powder bed;
increasing first intensities of first pixels of the image that are indicative of foreign objects within the image;
normalizing second intensities of second pixels of the image that are indicative of uneven illumination of the powder bed;
processing the image via contrast limited adaptive histogram equalization after increasing the first intensities and after normalizing the second intensities;
using graph-based image segmentation to identify third pixels of the image that correspond to an area of the powder bed that has been processed by the laser beam; and
indicating the third pixels via a user interface.

\* \* \* \* \*

UNITED STATES PATENT AND TRADEMARK OFFICE
CERTIFICATE OF CORRECTION

PATENT NO. : 12,243,215 B2  
APPLICATION NO. : 17/721905  
DATED : March 4, 2025  
INVENTOR(S) : Tianyu Jiang, Xu Chen and Mengying Leng Page 1 of 1

It is certified that error appears in the above-identified patent and that said Letters Patent is hereby corrected as shown below:

On the Title Page

Item (73) "Assignee: Univeristy of Washington, Seattle, WA (US)" should be "University of Washington, Seattle, WA (US)".

Signed and Sealed this
Twenty-ninth Day of April, 2025

Coke Morgan Stewart
*Acting Director of the United States Patent and Trademark Office*